April 14, 1942.  A. CHANOSKY  2,279,443
STEREOSCOPIC ATTACHMENT FOR CAMERAS
Filed May 11, 1940
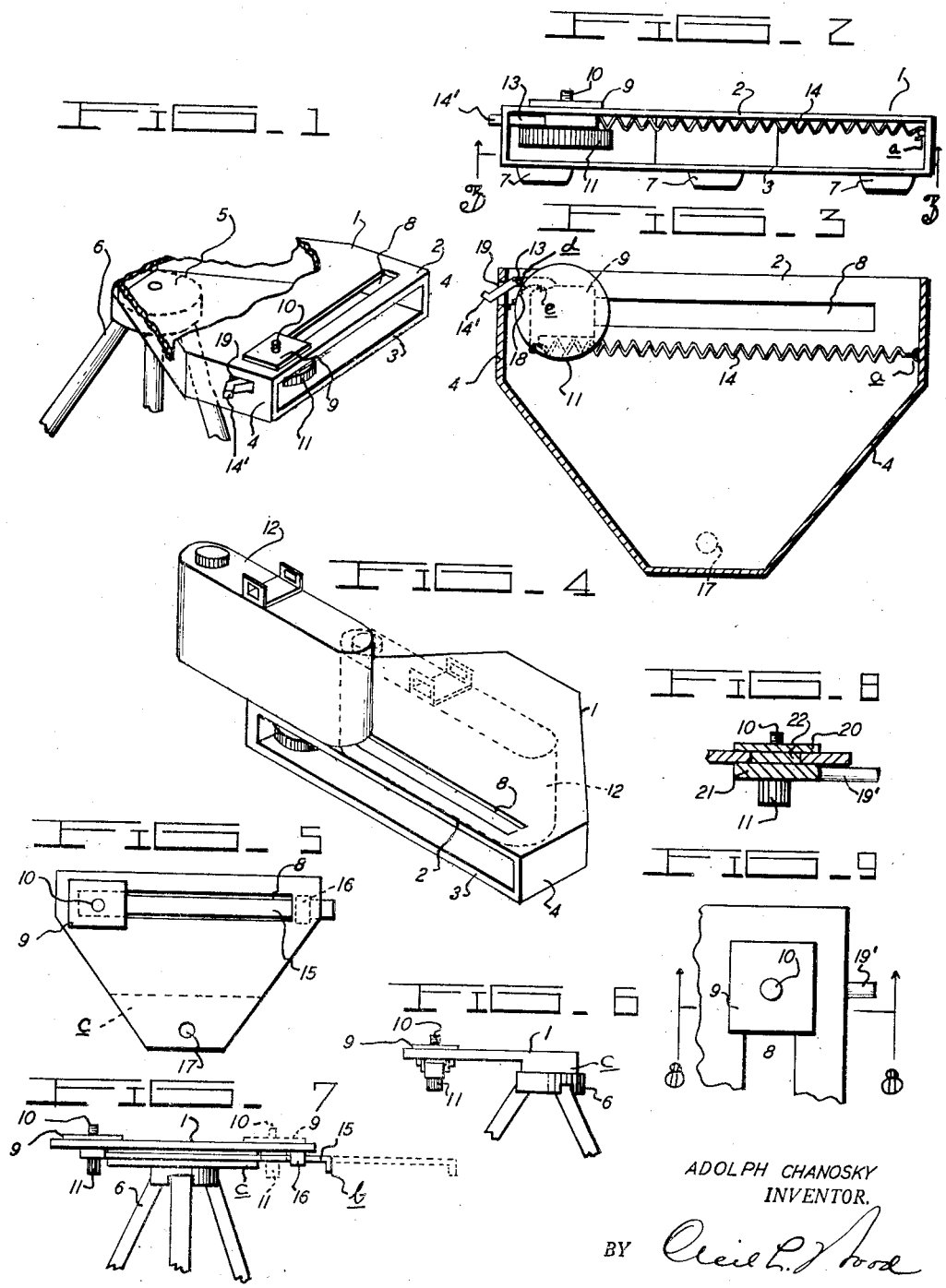
ADOLPH CHANOSKY
INVENTOR.
BY [signature]
ATTORNEY Patented Apr. 14, 1942

2,279,443

UNITED STATES PATENT OFFICE 2,279,443

STEREOSCOPIC ATTACHMENT FOR CAMERAS

Adolph Chanosky, Fort Worth, Tex.

Application May 11, 1940, Serial No. 334,488

6 Claims. (Cl. 95—86)

This invention relates to stereoscopic attachments for cameras and it has particular reference to a support to which a camera can be adjustably attached for limited lateral movement, and its principal object resides in the provision of a device of simple design and construction adapted to be attached to a tripod or other suitable support, whereby a camera may be adjustably secured thereto and adapted to a limited lateral movement to permit the taking of pictures in two positions which, when properly mounted and spaced, and when observed through a stereoscope, will present the object or subject photographed in its true appearance indicating depth as well as height and breadth.

Another object of the invention resides in the provision of a small, inexpensive structure capable of use in connection with any type of camera of general conventional use and provides for the taking of pictures for stereoscopic use by amateurs as well as professional photographers, the latter being usually equipped with double lens cameras with which stereoscopic pictures are ordinarily taken.

Broadly, the invention seeks to comprehend the provision of a simple, economical device enabling persons, irrespective of their previous experience, to photograph and arrange scenes or subjects in such a manner as to provide a stereoscopic photograph without professional aid.

While the foregoing objects are paramount, other and lesser objects will become manifest as the description proceeds taken in connection with the appended drawing wherein:

Figure 1 is illustrative of the preferred form of the device, showing portions cut away illustrating its structure, and showing the device attached to a tripod.

Figure 2 is an elevational view of the rear of the device illustrating the camera attaching device and tensioned operating mechanism.

Figure 3 is a lateral cross-sectional illustration taken on lines 3—3 of Figure 2 and illustrating the releasing pawl for the operating mechanism.

Figure 4 is a perspective illustration of the attachment showing a camera mounted thereon and illustrating, in dotted lines, the secondary position of the said camera for the second exposure.

Figure 5 is a plan view of a modified form of the device.

Figure 6 illustrates the modified form, shown in Figure 5, attached to the upper fragmentary portion of a tripod.

Figure 7 is a rear elevational view of the modification illustrated in Figures 5 and 6 and showing, in dotted lines, the manner in which the dual position of the camera is attained.

Figure 8 illustrates fragmentarily the slide arrangement, and

Figure 9 is another fragmentary illustration of the slide mechanism showing a modified handling arrangement.

Accordingly, therefore, the invention comprises a base member 1 preferably substantially triangular in shape, as illustrated in Figures 1 and 3, and formed of a top and bottom 2 and 3 and sides 4 defining a box-like structure, as particularly shown in Figures 1 and 4. At the front of the device where the sides 4 converge an interiorly threaded socket 5 is provided to receive a threaded spindle of the tripod 6 to which the assembly 1 may be attached. Obviously, however, the base 1 may be provided with legs 7, as shown in Figure 2, or the legs 7 may be formed to provide suction cups whereby the base may be placed upon a flat surface, such as a table, or the like, and made temporarily secure against displacement.

Along the rear edge of the top 2 is arranged a slot 8, shown in Figures 1, 3 and 4, and a sliding member 9, shown in Figures 8 and 9, is arranged in the slot 8 through which a threaded spindle 10 is arranged having a knurled head 11 at its lowermost end. The spindle 10 is of the conventional size of the tripod spindle adapted to be received by the tripod socket on standard cameras. Thus the camera may be attached to the spindle 10 in the same manner as the same would be attached to the tripod when the assembly 1 is not in use. Access to the knurled head 11 is gained through the open rear side of the device, as shown in Figures 1 and 4.

After the camera 12 is mounted upon the base 1, as previously described, the slide 9 may be moved to one end of the slot 8 for the first exposure, as illustrated in Figure 4, and retained by a pawl 13, illustrated particularly in Figure 3, against the tension of a spring 14 connected between the slide 9 and the opposite wall of the structure at a. When the pawl 13 is released by a pressure upon the handle 14' projecting through the sides 4 of the base 1 the spring 14 will contract and urge the slide, together with the camera 12, to the opposite end of the slot 8 for the second exposure.

The spring 14, however, is not included in the structure illustrated in Figures 5, 6 and 7, the slide 9 being urged along the slot 8 by a rigid bar 15 guided at one end of the slot 8 by a keeper 16, as illustrated in Figures 5 and 7. The bar 15 is preferably turned downwardly at b, at its operative end, providing a convenient grip by which the bar 15 may be urged along the slot 8, the opposite end of the bar 15 being connected to the slide 9.

It will be observed that the modified form of the base 1, as illustrated in Figures 5, 6 and 7, comprises only a plate, the front or narrowest side thereof c being relatively thicker than the other portions of the plate 1 affording a greater body through which an interiorly threaded aperture 17 is arranged for attachment to the tripod 6. The single plate in the base 1 illustrated in Figures 5, 6 and 7 is similar to the top 2 of the structure illustrated in Figures 1 to 4. The modified form of the device is adapted for manual operation and does not include the spring 14 and the pawl 13. The slide 9 in the modified structure is preferably mounted within the slot 8 in such a manner as to frictionally engage the edges thereof sufficiently to provide for firm retention at each end of the slot 8 as the guide 9 is adjusted therealong. Obviously, a projecting arm 19' may be provided to extend laterally from the guide 9 by which the latter may be moved along the slot 8 to adequately serve the purpose of the arm 15, as shown in Figure 9.

The pawl 13 is preferably pivoted at d and is adapted to be held in engagement with the slot e in the slide 9 by a spring 18, as illustrated in Figure 3. The pawl 13 is released from the slide 9 through the operation of the handle 14' of the pawl 13, as previously described. The handle 14' of the pawl 13 is adapted to extend through a slot 19 on one end of the base 1, as illustrated in Figures 1, 2 and 3.

The slide 9 is comprised of top and bottom plates 20 and 21 arranged on each side of the slot 8 and separated by a member 22 of a thickness approximating that of the top 2 and extending between both sides of the slot 8 to properly guide the member through the latter and prevent its rotation therein and retain the camera in fixed position. The member 22 should be of such dimensions as to freely operate within the slot 8 and not bind therein. This arrangement is shown in Figure 8. The topmost plate 20 of the slide assembly 9 provides a stable base for the camera 12 and retains the same in a rigid position upon the base 1.

Although the invention has been described with great particularity, it is obvious that certain changes and modifications may be resorted to from time to time by those skilled in the art, and such changes and modifications as may be considered as falling within the spirit and intent of the invention may also be considered as falling within the scope of the appended claims.

What is claimed is:

1. In combination with a camera, a stereoscopic attachment comprising a base, the said base forming a substantially triangular housing adapted to be supported by a tripod, means operative in a slot in the said base adjustably supporting the said camera and providing for limited lateral movement thereof and means including a spring for effecting the said movement.

2. In combination with a camera, a stereoscopic attachment comprising a supporting substantially triangular base adapted to be supported by a tripod, means including an elongated slot in the said base providing for the adjustable securement of the said camera to the said base, the said means adapted to move laterally in the said base whereby the said camera is restrictedly adjustable with respect thereto and means comprising a spring and pawl assembly for moving the said camera.

3. An adjustable mounting for a camera for stereoscopic prints comprising a horizontally disposed base, a slot along one side of the said base, means including a sliding member operatively arranged in the said slot providing adjustable attachment for the said camera to the said base and tensioned means in the said base for effecting a limited lateral movement of the said camera along the said slot, the said tensioned means adapted to be retained in operative position by a pawl.

4. In a stereoscopic mounting for cameras, a base member forming a shallow housing adapted to be detachably supported by a tripod, a slot arranged along the front of the said base, means including a slide arranged in the said slot adjustably securing a camera to the said base whereby the said camera can be focussed and moved along said base without readjusting the focus for two exposures.

5. A stereoscopic mounting for cameras comprising a base plate detachably supported by a tripod, adjustable means comprising a slot along one side of the said base and a slide operatively arranged therein securing a camera for limited lateral movement along the said base and stationary tensioned means effecting such movement.

6. In a mounting for a camera for stereoscopic prints, a substantially triangular base member, a slot along one side of the said base member, a slide arranged in the said slot for supporting a camera and providing for a limited lateral movement of the said camera along the said base and a spring for effecting such movement.

ADOLPH CHANOSKY.